(12) United States Patent (10) Patent No.: US 9,255,598 B2
Daehler (45) Date of Patent: Feb. 9, 2016

(54) TAMPER-RESISTANT LOCKING FASTENER COVER

(71) Applicant: ABB Technology AG, Zurich (CH)

(72) Inventor: Christian Daehler, Greensburg, PA (US)

(73) Assignee: ABB Technology AG, Zurich (CH)

( * ) Notice: Subject to any disclaimer, the term of this patent is extended or adjusted under 35 U.S.C. 154(b) by 79 days.

(21) Appl. No.: 14/197,623

(22) Filed: Mar. 5, 2014

(65) Prior Publication Data

US 2015/0252835 A1 Sep. 10, 2015

(51) Int. Cl.
*F16B 37/14* (2006.01)
*F16B 39/04* (2006.01)

(52) U.S. Cl.
CPC ..................... *F16B 39/04* (2013.01)

(58) Field of Classification Search
USPC ........... 411/372.5, 372.6, 373, 517, 522, 523; 70/158, 180, DIG. 34, DIG. 57
See application file for complete search history.

(56) References Cited

U.S. PATENT DOCUMENTS

| | | | | |
|---|---|---|---|---|
| 1,556,108 A * | 10/1925 | Harbert | ................... | F16B 21/10 188/231 |
| 1,691,893 A * | 11/1928 | Strid | ....................... | F16B 21/10 411/523 |
| 2,198,079 A * | 4/1940 | Ferris | .................... | E05B 67/383 292/143 |
| 2,840,245 A * | 6/1958 | Packard | .................. | B61G 7/08 213/50.5 |
| 3,459,096 A * | 8/1969 | Parkin | ..................... | F16B 5/065 411/523 |
| 3,498,173 A * | 3/1970 | Wright | ................ | F16B 23/0076 411/403 |
| 4,459,074 A * | 7/1984 | Capuano | ............. | F16B 23/0007 411/403 |
| 4,674,306 A * | 6/1987 | Halpern | .................. | B25B 13/48 70/167 |
| 4,761,975 A * | 8/1988 | Kachnowski | ......... | E05B 67/383 70/232 |
| 4,957,317 A * | 9/1990 | Jakubas | ................. | B65D 55/14 292/256.67 |
| 5,027,627 A * | 7/1991 | Derman | ................. | A47B 97/00 70/164 |
| 2010/0319415 A1* | 12/2010 | DeWalch | ................ | E05B 19/00 70/158 |

* cited by examiner

*Primary Examiner* — Roberta Delisle

(74) *Attorney, Agent, or Firm* — Taft Stettinius & Hollister, LLP

(57) ABSTRACT

A tamper-resistant fastening provision includes a fastener cover having a first flange and second flange joined at one end. The first flange has an elongate opening slidably receiving a shaft of a fastener, and the second flange has an opening disposed closer to a second end of the cover than the first end. The cover is moveable to a first position such that the fastener head is operably accessible through the second opening and the fastener shaft is disposed at an end of the elongate opening proximate to the second end of the cover. The cover is also moveable to a second position such that the cover is in an interference position relative to the fastener head and the shaft is disposed at an end of the elongate opening proximate to the first end of the cover.

10 Claims, 2 Drawing Sheets

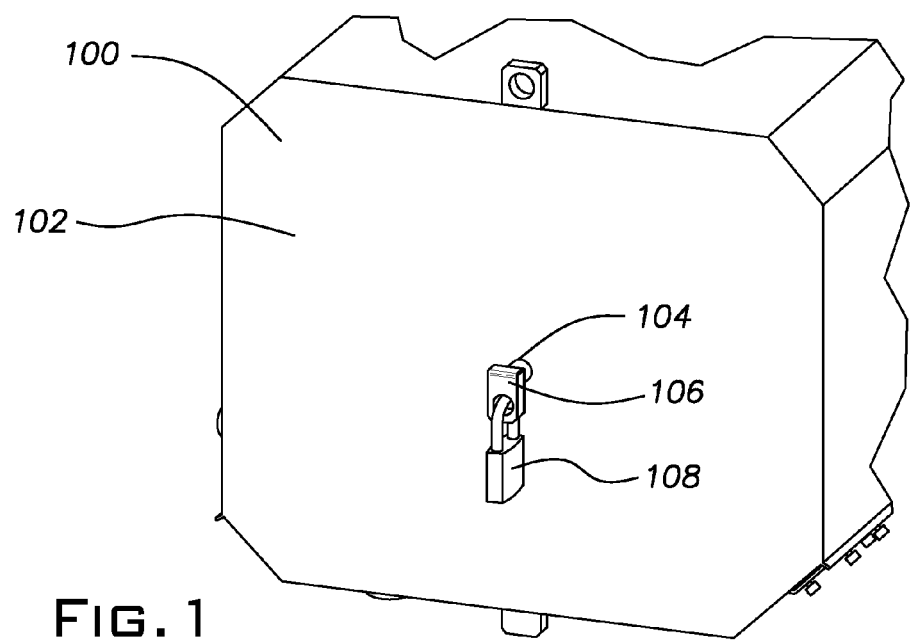
FIG. 1
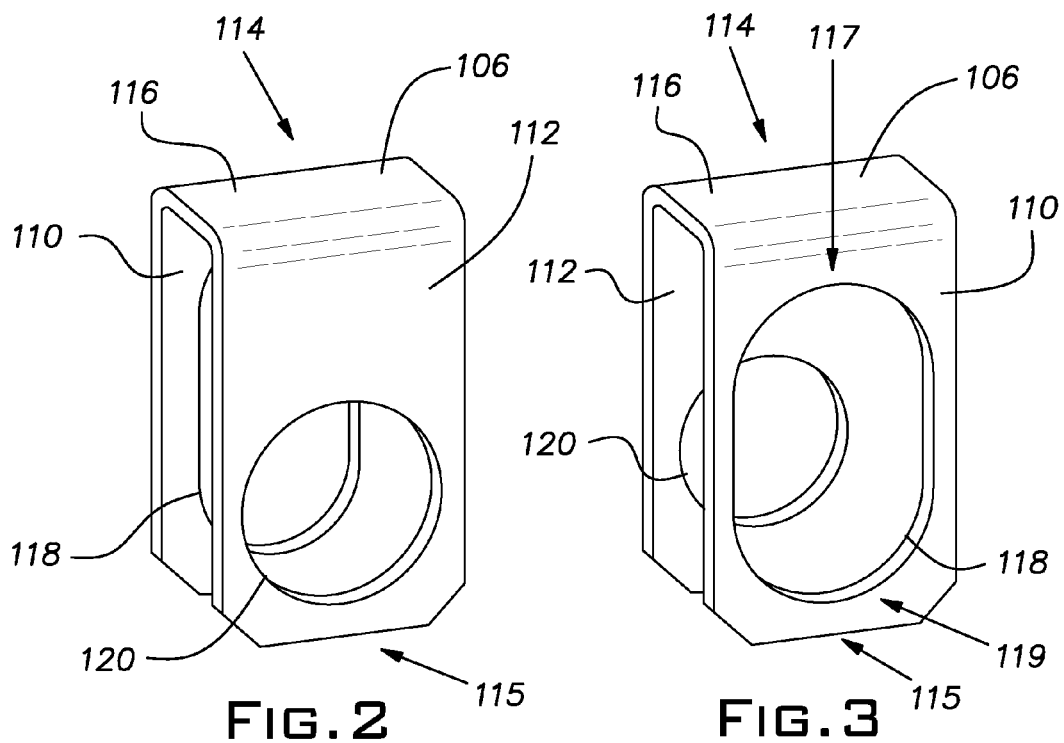
FIG. 2
FIG. 3

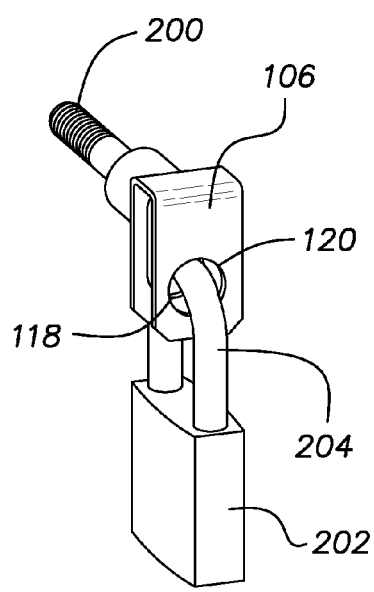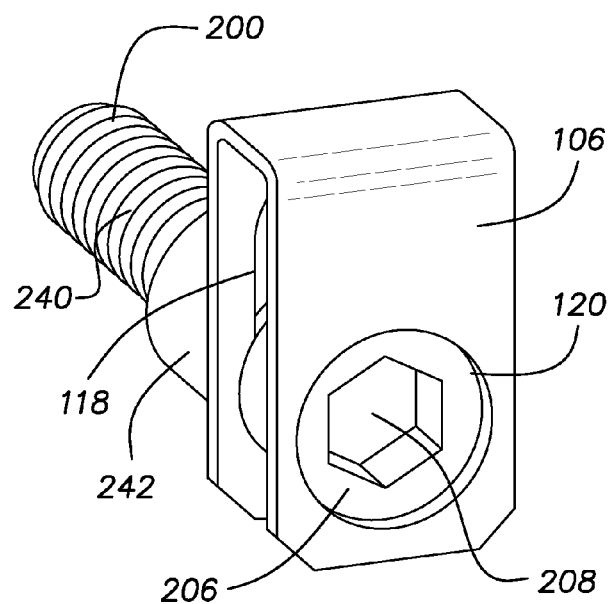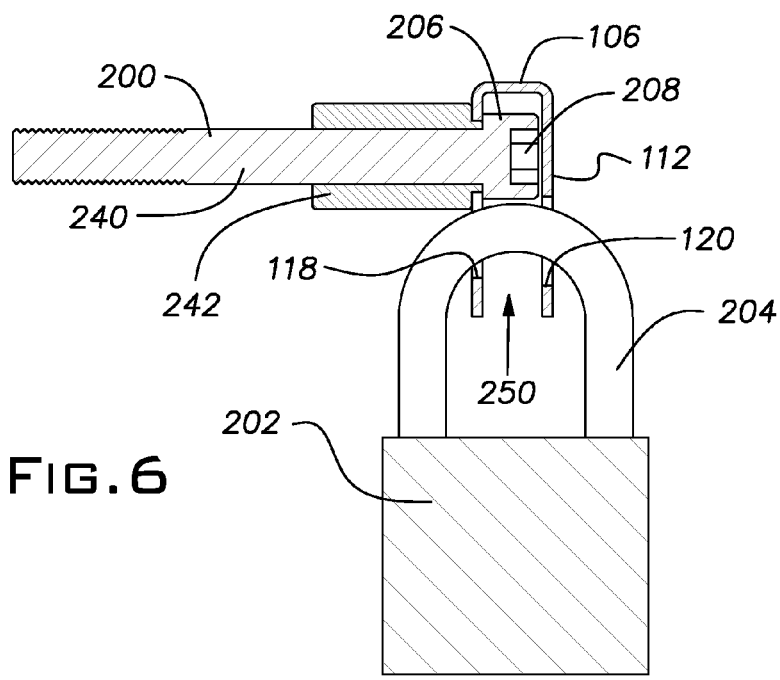

TAMPER-RESISTANT LOCKING FASTENER COVER

FIELD OF INVENTION

The present disclosure concerns tamper-resistant fastener provisions, and in particular tamper-resistant fastener provisions on electrical utility distribution and transmission equipment such as circuit breakers and transformers.

BACKGROUND

Unauthorized access to the internal components of electrical utility equipment such as transformers and circuit breakers can cause severe and costly damage with the potential to incur tremendous costs on communities dependent on reliable electrical power, including customers, safety forces, businesses and others. However, with additional security measures that mitigate unauthorized access, even individuals authorized to access and work on such electrical utility equipment can encounter greater relative burden in performing their tasks due to the increased difficulty in accessing the equipment. As just one example, the use of specialty fasteners that common tools are unable to loosen can result in delays in necessary repairs by authorized individuals, in particular during emergencies where immediate access by authorized individuals with only common tools is critical. It is therefore beneficial to have a fastener system at once allowing authorized access by those having only common tools and also securing the equipment against unauthorized access.

SUMMARY

A tamper-resistant fastening provision includes a fastener cover having a first flange and second flange joined at one end. The first flange has an elongate opening slidably receiving a shaft of a fastener, and the second flange has an opening disposed closer to a second end of the cover than the first end. The cover is moveable to a first position such that the fastener head is operably accessible through the second opening and the fastener shaft is disposed at an end of the elongate opening proximate to the second end of the cover. The cover is also moveable to a second position such that the cover is in an interference position relative to the fastener head and the shaft is disposed at an end of the elongate opening proximate to the first end of the cover.

BRIEF DESCRIPTION OF THE DRAWINGS

In the accompanying drawings, structures and methods are illustrated that, together with the detailed description provided below, describe aspects of a tamper-resistant locking cover for fasteners. It will be noted that a single component may be implemented as multiple components or that multiple components may be implemented as a single component. The figures are not drawn to scale and the proportions of certain parts have been exaggerated for convenience of illustration. Further, in the accompanying drawings and description that follow, like parts are indicated throughout the drawings and written description with the same reference numerals, respectively.

FIG. 1 illustrates a partial perspective view of a circuit breaker 100 having a tamper-resistant fastener cover 106.

FIG. 2 illustrates a perspective view of fastener cover 106.

FIG. 3 illustrates another perspective view of fastener cover 106.

FIG. 4 illustrates a perspective view of fastener cover 106 in a locked position.

FIG. 5 illustrates a perspective view of fastener cover 106 in an unlocked position.

FIG. 6 illustrates a cross-sectional view of fastener cover 106 in a locked position.

DETAILED DESCRIPTION

With reference to FIG. 1, a circuit breaker 100 with an outer body 102 includes a tamper-resistant fastener 104 having a fastener cover 106 that inhibits access to fastener 104. The cover 106 can be secured with lock 108 as shown in FIG. 1. Various forms of lock can be used according to the present teachings, including locks having various locking or keying mechanism, lock housings, and shackles or shanks, including but not limited to padlocks, combination locks, cable locks and key-based locks. In addition, the tamper-resistant fastener can be implemented with other electrical equipment, including but not limited to transformers.

With reference to FIGS. 2 and 3, the fastener cover 106 has a first flange 110 and second flange 112. The first flange 110 and second flange 112 are joined at one end 114 of the cover 106 by wall 116. The first flange 110 has an elongate opening 118, and the second flange has an opening 120. According to one aspect of the present teachings, the elongate opening 118 and opening 120 can take a variety of shapes different from those shown in FIGS. 1 and 2, including but not limited to rectangular or other polygonal shapes. According to another aspect of the present teachings, the elongate opening 118 has a greater cross-sectional area than opening 120. According to yet another aspect of the present teachings, the elongate opening 118 can have a first end 117 and second end 119, the first end 117 proximate to the first end 114 of the cover 106 and the second end 119 proximate to the second end 115 of the cover 106. According to another aspect of the present teachings, the elongate opening can extend closer to the end 114 of the cover 106 than the opening 120.

With reference to FIG. 4, the cover 106 is shown in a closed or locked position relative to a rotating member 200, which can be a socket head bolt having a recess 208 as illustrated in FIG. 5. With continued reference to FIG. 4, the rotating member 200 is slidably received in the elongate opening 118. When the cover 106 is in the closed or locked position, the rotating member 200 can be positioned proximate to the first end 117. According to another aspect of the present teachings, when the cover 106 is in the closed or locked position, the rotating member 200 can be positioned closer to the first end 117 than the second end 119. With further reference to FIG. 4, the shackle 204 of the padlock 202 can be passed through both the elongate opening 118 on the first flange 110 and the opening 120 on second flange 112. In this arrangement, the padlock 202 can be removably secured to the cover 106 when the lock 202 is in its closed and locked position. In the closed position the cover 106 can be in an interference position relative to the head 206 of the rotating member 200. The cover 106, when locked in position, can prevent access to rotating member 200.

With reference to FIG. 5, the cover 106 is shown in an open position. When the cover 106 is in the open position the rotating member 200 can be positioned proximate to the second end 119 of the elongate opening 118. According to another aspect of the present teachings, when the cover 106 is in the open position, the rotating member 200 can be positioned closer to the second end 119 than the first end 117. In the open position, the head 206 of rotating member 200 can be accessed through opening 120. According to one aspect of the present teachings, the recess or socket 208 of the fastener 200 can be accessed, for example with a corresponding tool, through opening 120 when the cover 106 is in the open position. The rotating member 200 can thus be rotated and adjusted as needed.

With reference to FIG. 6, the shaft 240 of the rotating member 200 extends from the head 206 at one end of the member 200 through the elongate opening 118. A spacer 242 that extends at least partially into the elongate opening 118 between the member 200 and cover 106 can surround the shaft 240 and be slidably engaged with the elongate opening 118 of cover 106. The shackle 204 can be placed in an interference position when passed through the elongate opening 118 and second opening 120 such that the cover 106 cannot be moved into the open position when the shackle 204 is disposed through the first opening 118 and second opening 120. The gap 250 between the first flange 110 and second flange 112 can be sufficiently wide to permit the head 206 of rotating member 200 to move between the first flange 110 and second flange 112 while the cover 106 is moved between open and closed positions.

In the present disclosure, reference numerals followed by alphabetic indices refer to one of the illustrated elements, while use of the reference numeral without the alphabetic indices refer to one or more of the illustrated elements. For the purposes of this disclosure and unless otherwise specified, "a" or "an" means "one or more." To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 6116 (2d. Ed. 1995). Also, to the extent that the terms "in" or "into" are used in the specification or the claims, it is intended to additionally mean "on" or "onto." As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term. From about A to B is intended to mean from about A to about B, where A and B are the specified values.

While the present disclosure illustrates various embodiments, and while these embodiments have been described in some detail, it is not the intention of the applicant to restrict or in any way limit the scope of the claimed invention to such detail. Additional advantages and modifications will be apparent to those skilled in the art. Therefore, the invention, in its broader aspects, is not limited to the specific details and illustrative examples shown and described. Accordingly, departures may be made from such details without departing from the spirit or scope of the applicant's claimed invention. Moreover, the foregoing embodiments are illustrative, and no single feature or element is essential to all possible combinations that may be claimed in this or a later application.

The invention claimed is:

1. A tamper-resistant device comprising:
 a fastener having an shaft and head disposed at a first end of the fastener shaft;
 a fastener cover having a first flange and second flange joined at one end of the cover, the first flange having an elongate opening slidably receiving the fastener shaft, the second flange having an opening disposed closer to a second end of the cover than the first end; and,
 wherein the cover is moveable to a first position wherein the head is operably accessible through the second opening and the shaft is disposed at an end of the elongate opening proximate to the second end of the cover, and is moveable to a second position wherein cover is in an interference position relative to the head and the shaft is disposed at an end of the elongate opening proximate to the first end of the cover.

2. The device of claim 1, wherein the first opening and second opening are positioned to receive a shackle of a lock when the cover is in the second position.

3. The device of claim 2, wherein the lock is selectively removable.

4. The device of claim 1, wherein the fastener is a socket head bolt.

5. The device of claim 4, wherein the socket head bolt has a socket operably accessible through the second opening when the cover is in the first position.

6. The device of claim 1 further comprising:
 a spacer having a wall forming a passage surrounding the shaft, the spacer slidably engaged with the cover and at least partially disposed within the opening in the second flange between the fastener and cover.

7. The device of claim 1, wherein the first and second flanges are flat and parallel to one another.

8. The device of claim 1, wherein the first opening has a greater cross-sectional area than the second opening and extends closer to the first end of the cover than the second opening.

9. A tamper-resistant device comprising:
 a fastener having an elongate shaft and head disposed at a first end of the fastener shaft;
 a fastener cover having a first flange and second flange joined at one end of the cover, the first flange having an elongate opening slidably receiving the fastener shaft, the second flange having a second opening disposed closer to a second end of the cover than the first end, the elongate opening and second opening positioned to receive a shackle of a selectively removable lock when the cover is in the second position; and,
 wherein the cover is moveable to a first position wherein the head is operably accessible through the second opening and the shaft is disposed at an end of the elongate opening proximate to the second end of the cover, and is moveable to a second position wherein cover is in an interference position relative to the head and the shaft is disposed at an end of the elongate opening proximate to the first end of the cover.

10. A tamper-resistant cover for a rotating member comprising:
 a cover having a first flange and second flange joined at one end of the cover and spaced apart to receive a head of a rotating member, the first flange having an elongate opening configured to slidably receive a shaft of the rotating member, the second flange having an opening disposed closer to a second end of the cover than the first end; and,
 wherein the cover is moveable to a first position wherein the head is operably accessible through the second opening and the shaft is disposed at an end of the elongate opening proximate to the second end of the cover, and is moveable to a second position wherein cover is in an interference position relative to the head and the shaft is disposed at an end of the elongate opening proximate to the first end of the cover.

* * * * *